United States Patent [19]
Hance et al.

[11] 3,915,002
[45] Oct. 28, 1975

[54] SAMPLER FOR MOLTEN MATERIALS

[75] Inventors: Richard J. Hance, Philadelphia; Philemon J. Moore, North Wales, both of Pa.

[73] Assignee: Leeds & Northrup Company, North Wales, Pa.

[22] Filed: Aug. 16, 1974

[21] Appl. No.: 498,170

[52] U.S. Cl. ............ 73/354; 73/425.4 R; 73/DIG. 9
[51] Int. Cl.² ............................................ G01N 1/12
[58] Field of Search ............... 73/DIG. 9, 354, 425.4

[56] References Cited
UNITED STATES PATENTS

| | | | |
|---|---|---|---|
| 3,455,164 | 7/1969 | Boyle | 73/354 |
| 3,557,624 | 1/1971 | Collins | 73/DIG. 9 |
| 3,656,346 | 4/1972 | Collins | 73/354 |

*Primary Examiner*—S. Clement Swisher
*Attorney, Agent, or Firm*—Philemon J. Moore; Raymond F. MacKay

[57] ABSTRACT

An immersion sampler for molten materials wherein the sampler is of the type adapted to fill from the immersion end thereof. The sampler is comprised of immersible body structure with wall portions defining side and end walls of a sample receiving cavity for the reception of a sample of molten material. There is wall structure defining an entrance passage to the cavity. The entrance passage differs from the conventional by having one end disposed at the immersion end of the body structure and the other end disposed between end walls of the cavity to prevent loss of sample from the cavity. The sampler additionally may include a heat sensing device disposed within the cavity for measuring the temperature of molten material received into the cavity as the material cools so that a cooling curve may be plotted and the amount of a constituent of the material may be determined from arrests in the cooling curve. The sampler device may additionally include a heat sensing device which projects outwardly of the body structure for measurement of the temperature of a bath of molten material into which the sampler is immersed and/or the sampler may also be provided with electrode structures projecting outwardly for forming together with the molten material of the bath a concentration cell useable for determination of a constituent of the bath.

7 Claims, 2 Drawing Figures

SAMPLER FOR MOLTEN MATERIALS

BACKGROUND OF THE INVENTION

1. Field of the Invention

Applicants' invention is for use with immersion sampler devices. Such devices are classified in the United States Patent Office with items relating to measuring and testing such as samplers and tollers and also with items for measuring and testing which include thermometer means, particularly those of the combined type including a sampling cup. To the extent that applicants' invention is useable with devices for measuring the oxygen content of a bath of molten material such as molten iron or molten steel, the apparatus relates to chemistry, electrical and wave energy and particularly that relating to processes and products, electrolysis and/or electrolytic apparatus for analysis and testing which includes a solid electrolyte.

2. Description of the Prior Art

Immersion samplers for molten material are well known in the art and are available in many configurations. Some fill from the top, some fill from the side, some fill from the bottom, i.e. the immersion end. There are several varieties of this latter type some of which are evacuated or are equipped with suction means to suck a sample into the sample receiving cavity and some include provisions for venting the sample receiving cavity so that it will fill due to the hydraulic head of molten material. Additionally immersion samplers are made from a wide variety of materials and vary widely in the manner of their construction. Some samplers are designed to obtain a cylindrical pin and some are designed to obtain a pin or pins with enlarged head portions which may be cylindrical or may include one or more flat surfaces. Also there are immersion sampler devices for obtaining samples wherein the passage through which molten material flows to the sample receiving cavity is made in the form of a tortuous path to enhance mixing of a deoxidizing material with the sample as taught in U.S. Pat. No. 3,415,125. U.S. patent application Ser. No. 467,186, filed May 6, 1975 by R. J. Hance, a co-inventor of the present application, discloses and claims still another form of construction wherein a venturi is employed to promote mixing of a sample with deoxidizing material and promote freezing of a portion of the sample upon cessation of inward flow of the molten material to prevent loss of sample.

Since the time that expendable immersion condition sensing devices, such as thermocouples, or the like as described in U.S. Pat. Nos. 2,999,121-H. G. Mead, 3,024,295-P. J. Moore, and 3,048,642-K. B. Parker, Jr. became commercially available many devices utilizing features thereof have come into use. U.S. Pat. No. 3,455,164-G. P. Boyle discloses and claims an immersion molten metal sampler which has an expendable thermocouple disposed in a sample receiving cavity to sense the temperature of the material of the sample as it cools within the cavity so that there may be recorded a cooling curve showing an arrest or arrests at temperatures indicating points of phase change from which arrests a constituent of a sample may be determined. In that patent there is also disclosed an immersion sampler device having a thermocouple projecting outwardly of the sampler body for sensing the temperature of a bath of molten material. There is also disclosed in said Boyle patent the manufacture of immersion sampler devices utilizing materials which are porous thus to provide means for venting the sample receiving cavity of the sampler.

As a result of using plug-in immersion sampler devices of the types disclosed in said Boyle patent it has been discovered that while filling of the sample receiving cavity posed no problem in the majority of applications it was found to be difficult if not impossible to obtain satisfactory samples when immersion samplers of the type described are inserted and withdrawn from a bath of molten material by means of an automatic inserter. One type of automatic insertion device encountered comprised a vertically reciprocating holder by means of which a sampler device is plunged below the level of a bath of molten material and then quickly withdrawn. Such an inserter effects a type of action entirely different from manual insertion where an operator affixes an immersion sampler to a long manipulator, lance, or holder and inserts the sampler into a bath at a substantial angle with respect to the vertical. The manual action is slower and there is less tendency to lose sample from the sampler.

Applicants have invented an improved construction such that a sample is positively retained in an immersion sampler device of the hydraulically filled type even under conditions wherein the material of the molten bath to be sampled is very fluid and under conditions where insertion is vertical and with a somewhat jerky motion.

SUMMARY OF THE INVENTION

In accordance with applicants' invention there is provided an immersion sampler device comprising an immersible body structure with wall portions defining side and end walls of a cavity for the reception of a sample of molten material and wall structure defining an entrance passage thereto wherein said entrance passage has one end disposed at the immersion end of said body structure and the other end thereof is disposed between the end walls of the cavity thus to prevent loss of sample from the cavity. The wall structure defining the entrance passage to the sample receiving cavity may be comprised of a portion of the material of the body or may be comprised of a tube of heat resistant material such as glass or fused quartz with one end thereof disposed approximately at the immersion end of the body structure and the other end thereof disposed between the end walls of the sample receiving cavity.

The sampler may additionally include one or more condition sensing devices such as a heat sensing device disposed within the cavity and/or a heat sensing device projecting outwardly from the body structure of the sampler, and/or there may be included electrode structures projecting outwardly from the body structure to form with the material of the molten bath an electrochemical concentration cell.

For a better understanding of applicants' invention and the advantages and objects thereof the following description and claims should be read with reference to the accompanying drawings.

DESCRIPTION OF THE PREFERRED EMBODIMENTS

Figure 1:
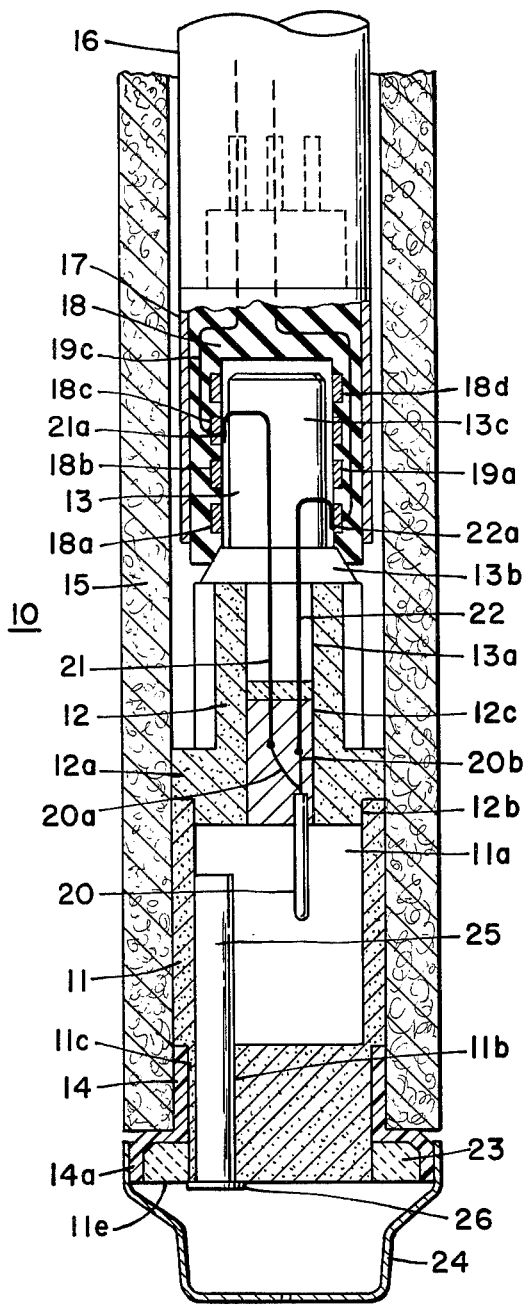
FIG. 1 is a side elevation partly in section of a sampler in accordance with applicants' invention including a heat sensing means with electrical wiring shown diagrammatically.

In FIG. 1 there is shown an immersion sampler 10 which includes a first body element 11, a second body element 12, a third body element 13, and a fourth body element 14 which are secured together and thereafter secured in the immersion end of a tube 15. Tube 15 for most applications may be made of heavy cardboard, however, as is well known to those skilled in the art there will be applications wherein the tube is made of other material such as graphite or metal protected with a refractory cement coating or equivalent. If the device is to be used in a molten material on which there may be a layer of slag, such as molten steel, there will be affixed to the body element 14 or the tube 15 a thin metal protective cap covering the immersion end of the sampler. As taught in the above mentioned Mead patent the cap may be of mild steel which will be destroyed after the immersion end of the sampler has been immersed to a position in a bath of molten material below the level of any slag which may be on the surface thereof.

Immersion samplers comprised of a mold supported at the immersion end of a tube are slid over and held at the end of a manipulator, holder, or lance 16 in a manner well known to those skilled in the art. The variety of mold cavity shapes, the methods of construction, and the materials which may be used is almost endless. Hereinafter only two modifications of samplers including applicants' invention are described, however it should be clearly understood that applicants' invention is useful in samplers of other types with or without sensing devices and made of materials other than shell molded sand. Additionally instead of using a tube, later to be described, for wall structure defining an entrance passage to the sample receiving cavity of the immersion sampler the wall structure may be comprised of the same material as the wall portions of the body structure which define the cavity walls. Such would be particularly applicable for split mold construction. It also is to be understood that in some modifications it may be found desirable to include low heat capacity heat insulating materials in association with the tube, or other structure, defining the entrance to the sample receiving cavity to prevent directly surrounding any substantial portion thereof with molten material.

For purposes of illustration applicant will describe his sampler as an improvement over samplers of the type disclosed in FIG. 6 of the above mentioned Boyle patent. However, it is to be clearly understood that applicants' invention is applicable and useable with samplers of other types such as outlined above.

Figure 2:
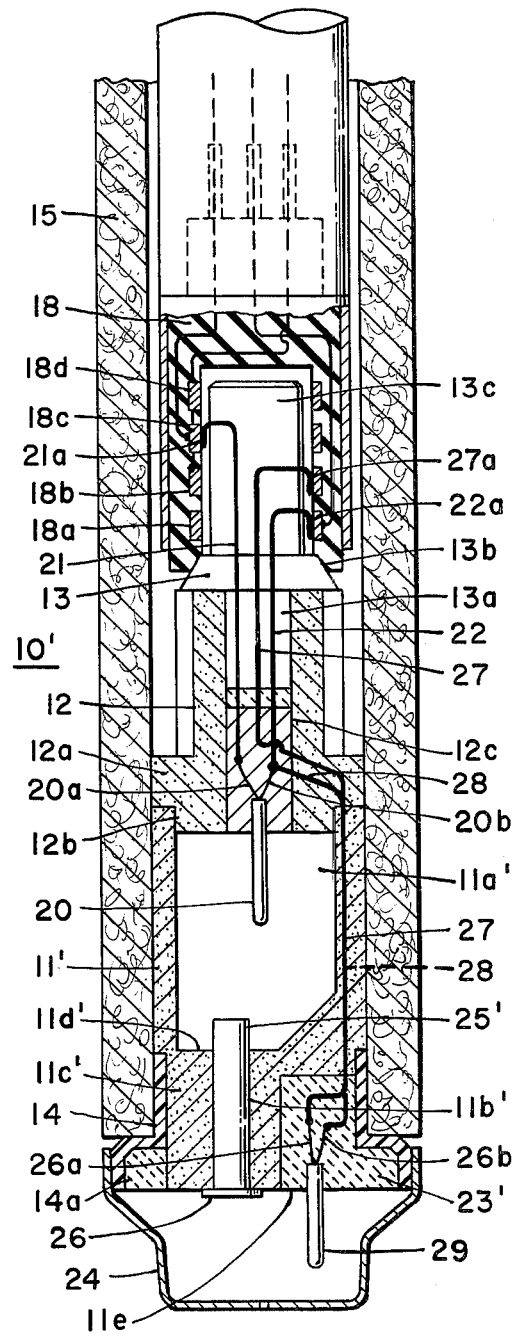
FIG. 2 is a side elevation partly in section of another modification of a sampler in accordance with applicants' invention with the electrical wiring shown diagrammatically.

Referring again to FIG. 1 the first body element 11 is in the form of a shell molded piece having a cylindrical exterior and a cylindrical cavity 11a therein. The cavity portion 11a includes a through hole 11b extending from the lower end wall 11d of cavity 11a, as viewed in FIG. 1, to the immersion end face 11e of element 11. Throughout applicants' specification and claims the term immersion end will frequently be used and when used refers to that end or portion of the device which first enters the molten bath when the sampler is immersed for obtaining a sample. In FIGS. 1 and 2 the immersion end is the end towards the bottom of the page as viewed by the reader. Inserted through the hole 11b is a tube 25 of fused quartz or VYCOR heat resistant glass which is utilized in accordance with applicants' invention for reasons later to to be described.

The upper end of body element 11 is closed by a second body element 12. The body element 12 may be a cylindrical section of shell molded sand having an annular rib 12a which is coextensive in outside diameter with the outside diameter of body element 11. The two diameters being a slide fit with respect to the internal diameter of the tube 15. Body element 12 includes a cylindrical portion 12b for nesting engagement with the upper end of body element 11 into which it is fitted and the parts secured together as by a ceramic cement not shown. Body 12 includes a through hole 12c in one end of which may be mounted a heat sensing device, for example a thermocouple 20, which as described in the above mentioned Boyle patent responds to the temperature of molten material received in cavity 11a while the material is cooling in order to obtain a cooling curve. As described in the above mentioned Boyle patent the cooling curve will have arrests from which may be determined a constituent of the sample in accordance with the well known cooling curve technique.

The connector structure for the termocouple 20 is well understood by those skilled in the art. It is of the type shown in the above mentioned Parker, Jr. patent and shown in FIG. 6 of the Boyle patent. Since it is not applicants' invention the parts are shown diagrammatically in FIG. 1 wherein wires 20a and 20b which may be elements of the thermocouple or leadwires of some other form of temperature sensing device are connected respectively to heavier wires 21 and 22 having bent-over portions 21a and 22a which are supported by portion 13c of a third body element 13 having an end 13a of reduced diameter which fits into the hole 12c of body element 12 and an enlarged portion 13b which forms a base for body element 13. The upwardly projecting cylindrical portion 13c forms back-up structure for the bent over contact wires 21a and 22a. The contacts are adapted for plug-in engagement with a connector 18 housed within a receptacle 17 in the manner fully described in the above mentioned Parker, Jr. and Boyle patents. The connector 18 may be comprised of material such as neoprene rubber which has been molded about a plurality of contact rings 18a, 18b, 18c, and 18d. While for the modification of the device disclosed in FIG. 1 only a two-ring contact is required and only two rings are utilized a four-ring connector has been adopted by applicants' assignee as a standard in order to provide for additional sensing devices. As may be observed by reference to the drawing the contact 21a engages ring 18c which is connected to a conductor 19c of a multi-conductor cable not shown. Likewise, the connector 22a engages ring 18a which is connected to a conductor 19a of the multi-conductor cable not shown. The cable not shown is conventional for establishing electrical connection between one or more sensing devices of the sampler and recording means as taught in the Boyle patent.

Body element 11 includes at its lower end a shouldered portion 11c of reduced diameter adapted to fit into the small diameter end of body element 14 which is in the form of a sleeve having an enlarged flange 14a which receives a quantity of refractory cement 23 effectively to seal the immersion end of body element 11 in place and protect the lower end of the tube 15. The element 14 may be of plastic. For a more complete description of such a structure see U.S. Pat. No. 3,298,874-R. E. Davies.

The material of a molten bath from which a sample is to be taken may vary from a viscous fluid to a very thin or watery liquid. When the fluid is viscous the passage for flow of fluid into the sample receiving cavity must be constructed and arranged so that sample does not freeze in the passage before the cavity for receiving the sample is adequately filled. When the sample is very thin or watery the passage for entry of the sample into the sample receiving cavity must be constructed and arranged in a manner to prevent loss of sample. In all arrangements it is to be clearly understood adequate means for venting the cavity is provided either by using porous material for one or more walls of the cavity as taught in the Boyle patent or by using venting passages to permit the escape of gas from the sampler so as not to block the entry of sample. Prior art means to obtain samples are satisfactory to a certain degree but have not been found completely satisfactory particularly when an immersion sampler is to be immersed into a basic oxygen furnace by means of an automatic inserter device.

Automatic inserters used with basic oxygen furnaces include a vertically reciprocating member to which an immersion sampler may be attached. The inserter immerses the sampler into the bath of molten steel contained within the furnace while the furnace is in an upright position and then quickly withdraws the sampler. When prior art samplers of the type shown in FIG. 6 of Boyle, which worked well for example in open hearth furnaces, were tried in a basic open hearth furnace using an automatic inserter satisfactory cooling curves were not consistently obtained. In accordance with applicants' invention this difficulty has been overcome by constructing an immersion sampler of the end fill type in a manner such that the flow passage through which sample is conveyed from the bath of molten material into the sample receiving cavity discharges the sample into the cavity at a location above the lower wall, that is to say the bottom wall of the sample receiving cavity. With this arrangement a definite quantity of sample will be trapped in the sample receiving cavity no matter how viscous or how thin and watery the sample may be so long as the entrance passage is dimensioned in a manner to pass sample into the sample receiving cavity and the cavity is properly vented. While a flow passage having its discharge end disposed between the upper and lower walls of the sample receiving cavity may be constructed and arranged using the material of the mold, applicants have found it most expedient to provide such a passage by utilizing a separate tube which extends upwardly from the bottom wall of the sample receiving cavity. For reasons unknown the distance between the inner end of the entrance passage and the bottom wall of the sample receiving cavity does not appear to be critical as shown by examples hereinafter set forth.

In FIG. 1 a tube 25 which may be of fused quartz, VYCOR, heat resistant glass, or other suitable material which will depend upon the temperature of use is disposed in a passage 11b and extends upwardly into the cavity 11a for a substantial distance. A sampler device such as illustrated in FIG. 1 which included a heat sensing element 20 and a sample cavity of the shape shown in FIG. 2 was successfully reduced to practice. The sample cavity was cylindrical and had an internal diameter of approximately 15/16 inch. The cavity was approximately 1 ¼ inch deep between its upper and lower walls and included a flat area which slanted upwardly and to the right at an angle of 45° beginning at a point disposed 3/32 inch to the right of the center line of the cavity. The center line of the heat sensing device which was a thermocouple as viewed in FIG. 1 was displaced 3/16 inch to the right of the center line of the cavity and protruded downwardly from the upper end wall 12b of the cavity a distance of approximately 21/32 inch. A tube of fused quartz having a nominal outside diameter of 9/32 inch and an internal diameter of approximately 3/16 inch was disposed against the cylindrical wall of cavity 11a and extended from a point 3/32 inch below the immersion end 11e of body element 11 to a point about 3/8 inch from the lower face of cylindrical portion 12b of body element 12 which forms the upper wall of cavity 11a. The sampler was immersed in low carbon steel at a temperature about 2920° F. and a satisfactory sample and a satisfactory cooling curve were obtained. The carbon equivalent as read from the chart was about 0.02%. An aluminum cap 26 covered the entrance to tube 25 so as to deoxidize the material as it flowed into and through tube 25 into the sample receiving cavity 11a. No bath temperature thermocouple was included in the sampler device of FIG. 1. Bath temperature was measured using a separate immersion thermocouple.

In FIG. 2 there is shown a sampler device 10'. Most of the parts utilized in the modification of FIG. 2 are identical with those utilized in the modification of FIG. 1. Those parts which are substantially the same and serve the same function are given a prime and those parts which are new receive different reference numerals.

Body element 11' differs from body 11 of FIG. 1 in that the body 11' has the through hole 11b' a little closer to the longitudinal center line of the body element. Additionally the shouldered portion 11c' has a notched-out portion to provide a cavity between it and the sleeve 14 for mounting a second heat sensing device 29 which is hereinafter referrred to as a thermocouple. The thermocouple 29 is mounted in projecting relation to the immersion end of the sampler device so as to respond to the temperature of the molten metal bath into which the sampler device is immersed. As shown diagrammatically the elements 26a and 26b of the thermocouple are connected to leadwires 27 and 28. The leadwire 27 has a bent-over portion 27a forming a contact for engaging ring 18b of the connector 18 and leadwire 28 is connected to lead 22 of the heat sensing device 20 and made common therewith. By using a common connection it is only necessary to use three contact rings of connector 18.

In the modification of FIG. 2 a fused quartz or VYCOR heat resistant glass tube 25' is disposed in the through hole 11b' of body element 11'. Immersion sampler devices were constructed in accordance with the arrangement shown in FIG. 2 wherein a tube 25' had an internal diameter of approximately 3/16 inch and an outside diameter of approximately 9/32 inch and projected into cavity 11a' for a distance of about ¼ inch above the bottom wall 11d'. These devices were immersed in a bath of molten steel in a basic oxygen furnace by means of an automatic inserter and satisfactory cooling curves and bath temperatures were recorded. In this modification an aluminum cap 26 closed the entrance to tube 25' and provided the necessary material for deoxidizing the sample as it flowed into the sampler cavity.

From the work done in reducing applicants' invention to practice it is evident that for samplers of the type which fill from the immersion end the introduction of the molten sample into the sample receiving cavity at a location between the end walls of the cavity was more effective to prevent run-out than any other arrangement known to applicants. While it was first believed necessary to place the point of discharge of molten material close to the top wall of the sample receiving cavity it was found to be satisfactory if the opening for the passage was placed above but still near the bottom wall of the sample receiving cavity. Additionally it was found necessary to provide ample clearance between wall structure of the cavity and wall structure of the entrance passage and the heat sensing device. From the foregoing it is believed clear that in an immersion sampler which is filled from the immersion end thereof by the hydraulic head of the material into which the sampler is immersed that a properly dimensioned flow passage and disposition of the end thereof between the end faces of a sample receiving cavity and, if a heat sensing device projects into the cavity, by properly spacing wall structure from the heat sensing device there will result an improved sampler which is less vulnerable to loss of sample when the device is withdrawn from a bath of molten material.

While the specific examples of some of the immersion samplers constructed in accordance with applicants' invention have been given they are not intended to be limiting. Where actual dimensions have been given it may be assumed that a reasonable tolerance is plus or minus 1/32 inch, however it will be found that other dimensions will produce satisfactory results depending upon materials and design used in constructing a sampler and the nature of the materials to be sampled. In some of the claims the generic language, "means for producing electrical signals", has been utilized to cover all types of temperature sensing devices, electrodes which with the molten material of a bath form a concentration cell, and electrodes of immersion depth alarm devices all of which have utility as a part of an immersion sampler in accordance with applicants' invention.

What is claimed is:

1. An immersion sampler device comprising an immersible body structure with wall portions defining side and end walls of a cavity for the reception of a sample of molten material and wall portions defining an entrance passage thereto wherein said entrance passage has one end disposed at the immersion end of said body structure beyond all sources of contamination of said sample by said sampler device and said entrance passage extends into said cavity at least one quarter of an inch to prevent loss of sample from said cavity.

2. An immersion sampler device comprising
   a tubular member,
   a heat destructible protective cap,
   a multi-element body structure supported in an immersion end of said tubular member,
   said body structure having wall portions defining side and end walls of a cavity for reception of a sample of molten material and wall structure defining an entrance passage thereto, and
   a heat sensing means disposed in said cavity and spaced from the walls thereof a distance adequate accurately to sense the temperature of molten material in said cavity as it cools,
   one end of said entrance passage being disposed between said cap and the immersion end of said body structure in avoidance of contamination of said sample by said body structure and the other end of said entrance passage being disposed between said end walls of said cavity for discharge of molten material into said cavity at a location spaced above the heat sensing means to insure that the heat sensing means is surrounded by the sample of molten material.

3. An immersion sampler device according to claim 2 wherein said sampler includes condition sensing means disposed exteriorly of said body structure for contact with a bath of molten material when immersed therein.

4. An immersion sampler device according to claim 2 wherein said sampler additionally includes a second heat sensing means disposed exteriorly of said body structure for sensing the temperature of a bath of molten material when immersed therein.

5. An immersion sampler device according to claim 2 wherein said cap is of deoxidizing material.

6. An immersion sampler device according to claim 2 wherein said tube is a tube of fused quartz or heat resistant glass.

7. An immersion sampler device according to claim 2 wherein some of said wall portions defining walls of said cavity are of a material which is porous for passage of gaseous materials therethrough for venting said cavity.

* * * * *